June 6, 1933. B. MILLER 1,912,949
AUTOMOBILE SAFETY CONTROL
Filed Sept. 19, 1931
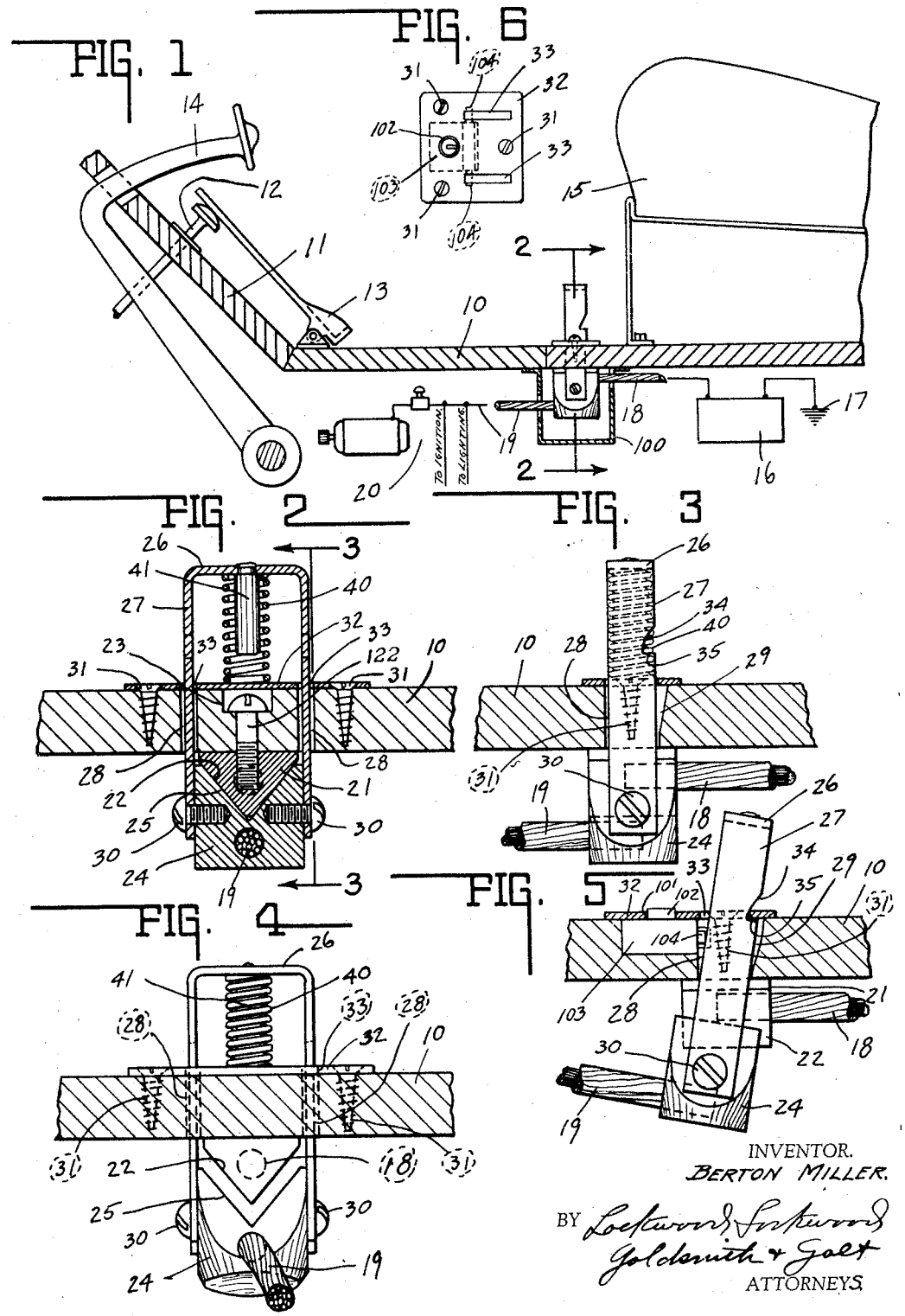
INVENTOR.
BERTON MILLER.
BY Lockwood Lockwood
Goldsmith & Galt
ATTORNEYS Patented June 6, 1933

1,912,949

UNITED STATES PATENT OFFICE

BERTON MILLER, OF BLOOMFIELD, INDIANA, ASSIGNOR OF FIFTY PER CENT TO HARVEY L. DONEY, OF BLOOMFIELD, INDIANA

AUTOMOBILE SAFETY CONTROL

Application filed September 19, 1931. Serial No. 563,383.

This invention relates to a cutout for the ignition system of the internal combustion engine of an automobile.

The chief object of the invention is to provide a cutout that can be readily actuated to open the ignition circuit and all other circuits connected to the source of electrical energy, such as the storage battery of an automobile by what might be termed the reflex action of the driver when the driver of the automobile realizes that a wreck is inevitable, so that danger of fire from short circuits will be substantially eliminated.

One feature of the invention consists in the mounting of the cutout in juxtaposition to the foot throttle and foot brake pedal so that the operator of the vehicle in shifting from the former to the latter can readily open the ignition circuit and without any appreciable delay, the movement to open the circuit for protection purposes being a slight addition of the usual movement that is imparted to the foot in shifting from the foot throttle to the brake pedal.

Another feature of the invention consists in the specific construction of the cutout.

The full nature of the invention will be understood from the accompanying drawing and the following description and claims:—

Fig. 1 is a central sectional view through the bottom of the driver's compartment of an automobile with the invention applied thereto and diagrammatically associated with a portion of the electrical system of the automobile.

Fig. 2 is an enlarged, longitudinal, sectional view through the cutout taken on line 2—2 of Fig. 1 and in the direction of the arrows.

Fig. 3 is a side view taken on line 3—3 of Fig. 2 and in the direction of the arrows and at right angles to Fig. 2.

Fig. 4 is an elevational view of the cutout shown mounted and in the open circuit position and is taken looking in the direction of the arrows 2—2 of Fig. 1.

Fig. 5 is a view similar to Fig. 3 and of the parts in a position corresponding to those shown in Fig. 4.

Fig. 6 is a top plan view of a lock structure type of the invention.

In the drawing 10 indicates the floor board of the driver's compartment, 11 the toe-board thereof through which extends the foot throttle rod 12, operatively associated with which is the pedal 13. Also extending through the toe-board is the brake pedal control member 14. Positioned in the compartment is the driver's seat 15. Immediately forward of the driver's seat 15 and rearward from the throttle rod and the brake pedal, is the cutout mechanism and the same is positioned between the two, to wit, the throttle and the brake pedal. The operator in removing his foot from the foot throttle lever brings it back just a little farther than he usually does and engages the cutout switch, operates the same, and then brings the foot forward for brake pedal engagement in the usual manner and all in one operation.

In Fig. 1, 16 indicates the battery or source of electrical energy, 17 the usual ground connection, 18 the insulated main line leading from the battery and in this instance, the same is connected to the cutout. Leading from the cutout is an insulated main line 19 which is operatively associated with the remainder of the electrical system of the automobile, the same being indicated generally by the numeral 20 in Fig. 1.

The cut-out construction is shown in all of the figures and includes the V-shaped contact member 21 having the faces 22 and suitably secured to the supporting base which, in the present instance, is the floor board 10 and by a bolt 122, the head of which is seated in the recess 23. Contact member 21, as illustrated, is directly connected to the current conductor 18. A V-notched contact member 24 has the complementary faces 25 and is operatively connected to the current conductor 19. A U-shaped strap having a mid-portion 26 and a pair of arms 27 is positioned relative to the supporting base or floor board, to wit, so that its mid-portion 26 is positioned upon the opposite side of the board from the contact 21 and the depending arms 27 of the U-shaped strap member extend through slots 28 in the floor board and as shown in Fig. 3 said slots have inclined side walls 29. The free ends of the strap arms 27 are suitably secured as at 30 to the contact member 24. Suitably secured as by screws 31 to the upper face of the floor board 10, is a plate 32 which is provided with slots 33 therein, the same registering with the slots 28 but the edges of said slots 33 overhang the inclined portions 29 of slots 28.

As shown in Figs. 3 and 4, the aforesaid construction provides a catch. Each arm 27 is suitably notched as at 34 to provide a shoulder 35 which is adapted to engage beneath and bear upon the under face of the plate 32.

To normally retain the contact members in closed circuit position and in order to retain the contact member in open circuit position when latched in the open circuit position, there is provided a spring 40 which is concentric with a stud or stem member 41 carried by the mid-portion of the U-shaped strap and said stud not only serves as an aligner for the spring but also as a spring retainer.

As shown in Fig. 1, the switch mechanism may be enclosed within a housing 100. Said housing prevents dirt accumulating on and between the switch contacts 22 and 25. Furthermore, said housing prevents unauthorized short circuiting of the switch as by the insertion of a screw driver or the like between said contacts.

When the housing 100 is employed and it is desired to completely prevent unauthorized short circuiting of the switch there is provided a lock structure, see Figs. 5 and 6. In said figures the plate 32 includes an aperture 101 through which is exposed the key operable portion 102 of a lock 103 provided with oppositely directed bolts 104. When the key is turned bolts 104 are projected into registration with slots 33 of plate 32 after the switch has been opened. The bolts, as shown in Fig. 5, prevent portions 27 from being moved forwardly and therefore, shoulders 29 cannot be released from the catch portion of slot 33 of plate 32.

The invention claimed is:—

1. An electrical system cutout, comprising a supporting base, a V-shaped contact secured to one surface of the base, a V-notched contact adjacent thereto, each contact being arranged for connection to an electrical circuit wire, a U-shaped strap having its mid-portion upon the opposite side of the supporting base and its arm portions extending through a slotted arrangement therein and secured to the notched contact, means normally constraining the contacts toward closed circuit position, and means operatively associated with the strap for latching the contacts in open circuit position.

2. An electrical system cutout, comprising a supporting base, a V-shaped contact secured to one surface of the base, a V-notched contact adjacent thereto, each contact being arranged for connection to an electrical circuit wire, a U-shaped strap having its mid-portion upon the opposite side of the supporting base and its arm portions extending through a slotted arrangement therein and secured to the notched contact, means normally constraining the contacts toward closed circuit position, and means operatively associated with the strap for latching the contacts in open circuit position, the supporting base slotted arrangement having an inclined wall extending away from the contact supporting surface thereof, said means including a catch portion adjacent the end of said inclined wall, and a shoulder forming recess formed in the arm portions for engaging the catch portion when the U-shaped strap is depressed and rocked into locking engagement.

3. An electrical system cutout, comprising a supporting base, a pair of slots therein, a U-shaped strap, the arms of said strap extending through and being slidably and tiltably mounted in said slots, a contact carried by said base, another contact carried by the ends of said strap and arranged for contact to contact engagement, yielding means interposed between the base and the mid-portion of the U-shaped strap and arranged to cushion the descending movement of the strap and arranged to normally retain the strap in the projected position, and a catch and latch connection operatively interposed between the base and the strap, said yielding means being arranged to normally retain the latch and catch connection in operative association when the mid-portion of the strap is moved toward the base.

In witness whereof, I have hereunto affixed my signature.

BERTON MILLER.